Dec. 16, 1941.  P. A. RAICHE  2,266,263
MANUFACTURE OF RUBBER ARTICLES
Filed Jan. 19, 1939   2 Sheets-Sheet 1
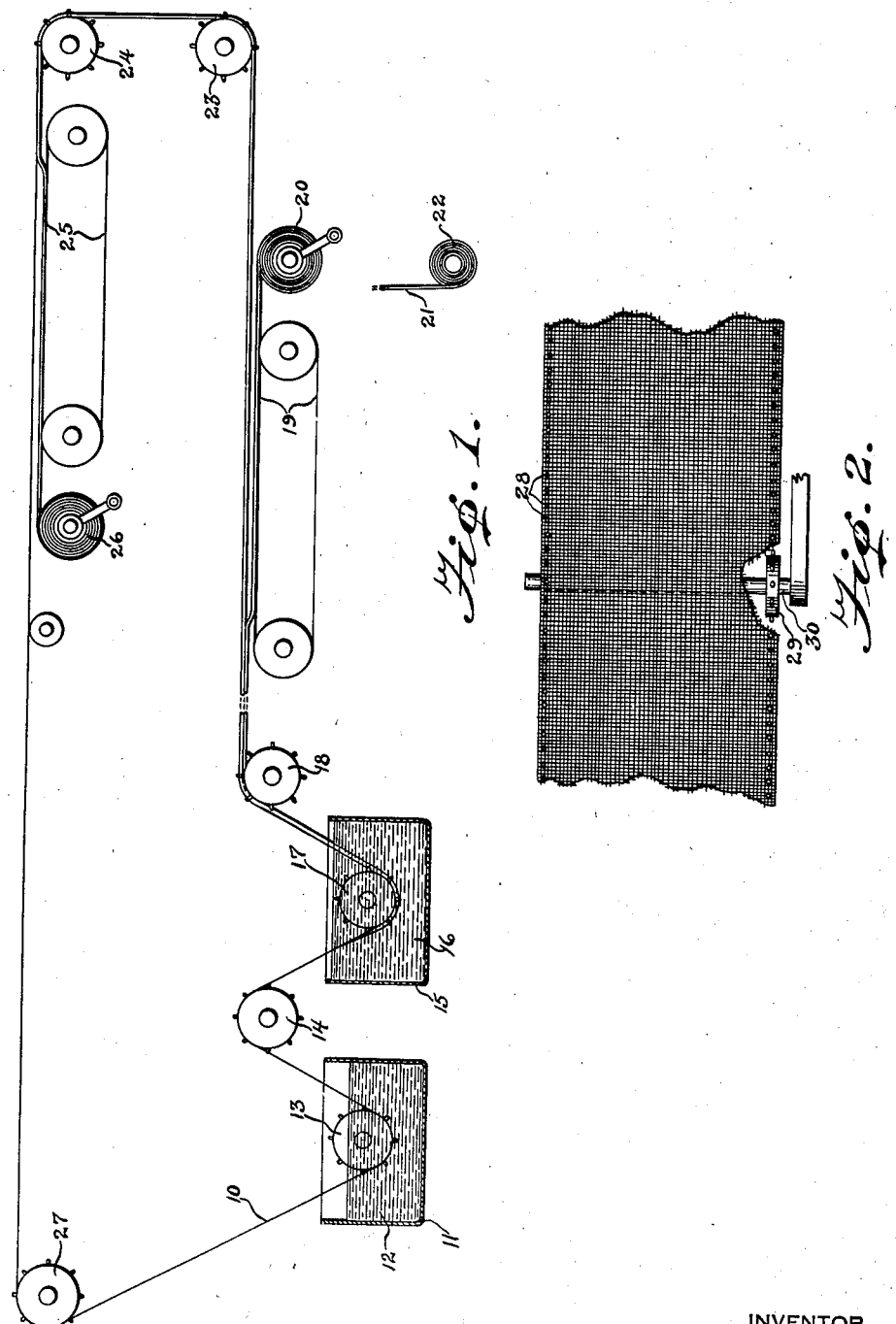
INVENTOR
Paul A. Raiche
BY
Nathaniel Frucht
ATTORNEY Dec. 16, 1941.  P. A. RAICHE  2,266,263
MANUFACTURE OF RUBBER ARTICLES
Filed Jan. 19, 1939  2 Sheets—Sheet 2

INVENTOR
Paul A. Raiche
BY
Nathaniel Frucht
ATTORNEY

Patented Dec. 16, 1941

2,266,263

UNITED STATES PATENT OFFICE 2,266,263

MANUFACTURE OF RUBBER ARTICLES

Paul A. Raiche, Providence, R. I., assignor to Davol Rubber Company, a corporation of Rhode Island Application January 19, 1939, Serial No. 251,733

7 Claims. (Cl. 18—15)

My present invention relates to the manufacture of rubber articles, and has particular reference to the formation of rubber articles by dipping.

The present methods of dipping rubber articles include the acetic acid process and the solid coagulant process. In the acetic acid process a solid form of glass, porcelain, or metal is first dipped in latex solution, dried, dipped in acetic acid solution, and dried again, the process being repeated at least once in order to obtain a sufficiently thick coat; the rubber coat is then stripped from the form, either before or after curing. The solid coagulant process uses a plastic coagulant solution into which the form is dipped to obtain a coagulant coat; the dipped form is dried, then dipped into latex for a sufficient time to build up a rubber coat of the desired thickness, and again dried. These processes therefore include a sequence of dips with a drying step between dips, followed by a final drying.

My present invention contemplates a novel method of dipping which produces a novel rubber product in fewer steps and in a fraction of the time required for the methods heretofore used. To this end, I utilize a novel, inexpensive form, which has the property of retaining liquid acetic acid solution on the surface thereof, whereby dipping the form into the acetic acid solution and then into latex solution produces an instantly coagulated coat of substantial thickness which is very quickly dried to produce a dipped rubber article. The principal object of my invention is thus to provide a low cost, rapid manufacture of dipped rubber articles.

The heretofore utilized forms of glass, porcelain, or metal are expensive to manufacture, particularly for articles of difficult or unusual shape. It is therefore an additional object of my invention to provide an inexpensive form which may be readily made for any desired shape of completed product.

Moreover, the dipped products heretofore have been of smooth surface, and cannot be ornamented or otherwise marked. A further object of my invention is to form dipped rubber articles having a slightly rough surface, the articles being suitably ornamented or marked during the manufacture thereof.

With the above and other objects and advantageous features in view, as will hereinafter appear, my invention consists of a novel method, a novel apparatus, and a novel product more fully disclosed in the detailed description following, in conjunction with the accompanying drawings, and more specifically defined in the claims appended thereto.

In the drawings:

Fig. 1 is a diagrammatic showing of a novel apparatus for the manufacture of rubber sheets;

Fig. 2 is an enlarged detail thereof, showing the apron form and one pair of driving sprockets;

Figure 3:
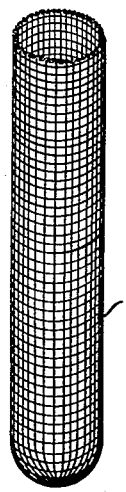
Fig. 3 is a perspective view of a form for a finger cot.
Figure 4:
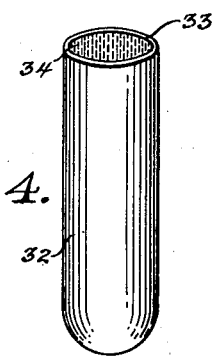
Fig. 4 is a perspective view of the resulting dipped finger cot.

It has been found desirable to simplify and expedite the formation of rubber articles by dipping, and I therefore utilize a wire mesh form which is first dipped into a solution of acetic acid and alcohol, preferably fifty per cent of each, and then into a latex bath; the wire mesh retains the acetic acid solution between the wires and evenly distributed over the form, and thus produces an immediate coagulation of the latex coat, and the alcohol quickly evaporates as the coated form is removed from the latex bath, to rapidly dry. Any suitable design or mark may be woven into or placed on the wire mesh, whereby a corresponding design or mark is obtained on the finished rubber product; the product also has a roughened surface, as the latex slightly penetrates the mesh interstices, and this roughened surface is non-slipping and non-clinging or adhesive.

Referring now to Fig. 1 of the drawings, which diagrammatically illustrates an apparatus suitable for the continuous formation of rubber sheets, a continuous apron 10 of wire mesh, preferable made of nichrome steel having 34 to 40 wires per inch, passes into an acetic acid solution tank 11, containing a bath 12 of fifty per cent acetic acid and fifty per cent alcohol, over driving sprockets 14 to dip into a latex tank 15 having a latex bath 16, then under driving sprockets 17 and out over driving sprockets 18.

The apron 10 has now become coated on both sides with latex, which has rapidly coagulated without contacting, due to the presence of the acetic acid between the coats; the apron now moves over a short distance to permit drying, a suitable speed of apron travel for this purpose being about five feet per minute, and passes over a conveyor 19 on which the lower rubber coat falls, for reeling onto a reel or spool 20. The rubber sheet is uncured, but will reel without adhering contact; if desired, a textile liner 21 may be unwound from a supply reel 22 to provide an intermediate liner.

The apron, still carrying the upper coat, passes around sprockets 23 and 24 and over a second conveyor 25, which thus receives the other rubber sheet for reeling onto a reel or spool 26, a textile liner (not shown) being provided if desired. The apron is now clear, and passes over sprockets 27 to again enter the acetic acid tank.

The apron is provided with a series of spaced edge perforations 28, see Fig. 2, which may be in a metallic edge band or rim if desired, and which cooperate with the spaced teeth 29 of the sprockets; each set of sprockets has a common shaft 30, and is pulley and belt driven in positive unison with the other sprockets.

If desired the rubber sheets on the apron may be passed through a hot water bath (not shown) for curing prior to reeling, the temperature of the hot water being about 190 degrees. Since the curing takes an appreciable time, the hot water bath required is fairly long; a short bath may be used, however, if the speed of apron movement is reduced to two feet per minute.

The novel method may be utilized for dipping any type of thin rubber articles; thus a wire mesh finger cot form 31, see Fig. 3, is dipped into acetic acid solution, and then into latex. The interstices of the form retain the acetic acid solution, and penetration of the form by the latex is prevented because coagulation takes place on the inner surface of the coating, thus resisting inward movement of the latex due to depth pressure; the coating may be readily removed after a very short interval for drying, as a completed finger cot 32. The finger cot inner surface 33 has a plurality of elevations 34 produced by the slight penetration of the latex into the wire mesh interstices, which form a non-adhesive, non-slipping surface. The same procedure may be followed for other rubber articles such as rubber panties, bathing caps, tobacco pouches, and the like.

Figure 5:
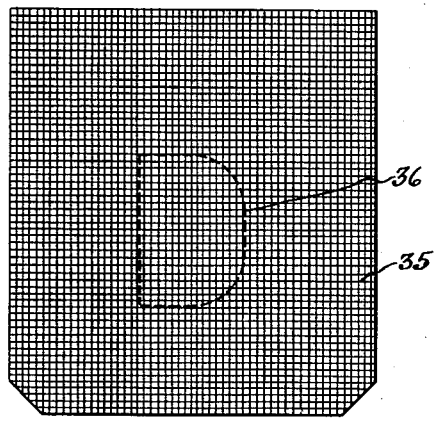
Fig. 5 is a plan view of a form section, having a mark or ornament design.
Figure 6:
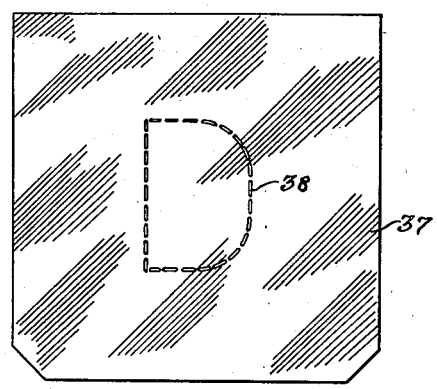
Fig. 6 is a plan view of the resulting rubber sheet, having a corresponding mark or ornament.
Figure 8:
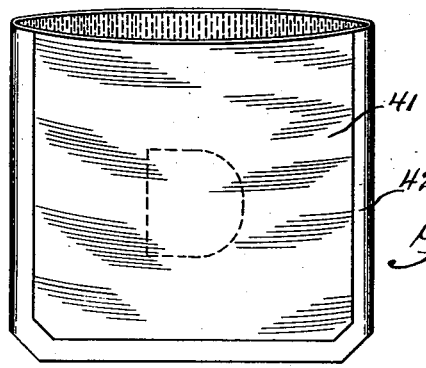
Fig. 8 is a perspective view of a dipped rubber bag, the edges being reinforced.
Figure 7:
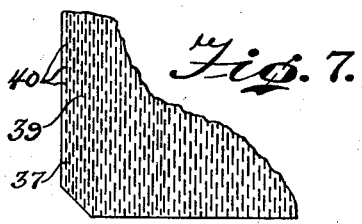
Fig. 7 is a detail fragment showing the back of the resulting rubber sheet.

The formed rubber articles may be readily ornamented or marked during manufacture. Thus, the sheet form 35, see Fig. 5, may have a design 36 integral therewith, or obtained by weaving wire or the like into the form. The resulting dipped product 37 has a corresponding design 38, similar to a watermark on paper; moreover, the back surface 39 has the spaced elevations 40 hereinbefore mentioned, which increase the attractive appearance.

If the form 35, which is merely a flat sheet, is dipped vertically into the acid and latex tanks, a bag or pocket 41 results, which may have reinforced edges 42 as a consequence of a second dipping at the edges. The form 35 may be provided with metal edges or beads, not shown, if desired, to obtain a smoother bend for the rubber bag or pocket.

It is thus evident that the improved method is simple, is low in cost, reduces the number of manufacturing operations, decreases the operating time, and produces an improved product which may be suitably ornamented or marked, and which has a non-slipping, non-adhering surface. While I have described specific apparatus suitable for carrying out the method, and specific products, it is obvious that the forms used may be varied as desired, to obtain products having different characteristics of shape and markings. Moreover, while I have disclosed the use of wire mesh for the forms, any material capable of retaining the acetic acid solution on its surface, as by surface tension or capillary action, may be used.

For example, it has been determined that a mold having a roughened surface, as for example a knurled surface, the mold being preferably made of metal, will retain a sufficient amount of acid solution to produce the desired effects, as the knurling prevents running off of the acid solution such as occurs with a smooth surface. The character of the knurling has an effect on the amount of acid solution retained, the deeper cuts retaining more acid. It has also been found that roughened or knurled molds may be advantageously employed in the processes heretofore used, to obtain a product that is roughened or is distinctively marked; and ornamental effects may be readily obtained by using composite smooth and roughened or knurled forms, as the smooth section, with the previous processes, produces a thin coat while the roughened section produces a thicker and ornamented coat, whereby the finished product includes both thin and thick sections.

Moreover, while I have described the liquid coagulant as acetic acid solution, the proportion of fifty per cent acetic acid and fifty per cent alcohol, mixtures of forty per cent acid and sixty per cent alcohol, or with lesser percentages of acid, have also been found satisfactory. Other coagulants than acetic acid may be used, as for example calcium saturated salts such as calcium nitrite, and acetone.

The forms, their materials, their markings, and their manner of dipping, may be changed as appears desirable or suitable, within the spirit and the scope of the invention as defined in the appended claims.

I claim:

1. In a method of forming rubber articles by dipping, the steps of dipping a wire mesh form having an ornamentation or mark thereon and of sufficient fineness to be capable of retaining liquid coagulant in the interstices thereof and capable of being coated with latex on the surface thereof, into a liquid coagulant solution, and then into a latex solution, and removing the coating deposited by the dipping from the form.

2. In a continuous process for forming rubber articles by dipping, the steps of moving a wire mesh form of sufficient fineness to be capable of retaining liquid coagulant in the interstices thereof and capable of being coated with latex on the surface thereof, into a liquid coagulant solution, then into a latex solution, drying the coated form, and stripping the resulting product from the form.

3. In a continuous process for forming rubber articles by dipping, the steps of moving a wire mesh form having an ornamentation or mark thereon and of sufficient fineness to be capable of retaining liquid coagulant in the interstices thereof and capable of being coated with latex on the surface thereof, into a liquid coagulant solution, then into a latex solution, drying the coated form, and stripping the resulting product from the form.

4. In a continuous process for forming rubber sheets by dipping, the steps of moving a wire mesh sheet form of sufficient fineness to be capable of retaining liquid coagulant in the be capable of retaining liquid coagulant in the interstices thereof and capable of being coated with latex on the surface thereof, into a liquid coagulant solution, then into a latex solution, drying the coated form, and stripping the resulting product from the form.

5. In a continuous process for forming rubber sheets by dipping, the steps of moving a wire mesh sheet form having an ornamentation or mark thereon and of sufficient fineness to be capable of retaining liquid coagulant in the interstices thereof and capable of being coated with latex on the surface thereof, into a liquid coagulant solution, then into a latex solution, drying the coated form, and stripping the resulting product from the form.

6. The method of forming rubber bags, pockets and the like, comprising the steps of dipping a wire mesh sheet of sufficient fineness to be capable of retaining liquid coagulant in the interstices thereof and capable of being coated with latex on both surfaces thereof, into a liquid coagulant solution, then into a latex solution, drying the coated sheet, and stripping the rubber article therefrom.

7. In combination, a continuously moving conveyor of wire mesh, said mesh being sufficiently fine to be capable of retaining a liquid coagulant in the interstices thereof and capable of being coated with latex on the surface thereof, a liquid coagulant dip tank, a latex dip tank, and means for moving said conveyor successively through said liquid coagulant and latex dip tanks.

PAUL A. RAICHE